US011783472B2

(12) United States Patent
Tsubaki et al.

(10) Patent No.: US 11,783,472 B2
(45) Date of Patent: Oct. 10, 2023

(54) COLOR TONE CORRECTION SYSTEM AND COLOR TONE CORRECTION METHOD

(71) Applicant: TOYOTA JIDOSHA KABUSHIKI KAISHA, Toyota (JP)

(72) Inventors: Yuta Tsubaki, Toyota (JP); Shun Sato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 263 days.

(21) Appl. No.: 17/376,714

(22) Filed: Jul. 15, 2021

(65) Prior Publication Data

US 2022/0044380 A1 Feb. 10, 2022

(30) Foreign Application Priority Data

Aug. 7, 2020 (JP) ................. 2020-134738

(51) Int. Cl.
| | |
|---|---|
| *G06T 7/00* | (2017.01) |
| *G06T 7/90* | (2017.01) |
| *G06T 7/73* | (2017.01) |
| *H04N 9/64* | (2023.01) |

(52) U.S. Cl.
CPC ............... *G06T 7/001* (2013.01); *G06T 7/74* (2017.01); *G06T 7/90* (2017.01); *H04N 9/646* (2013.01); *G06T 2207/30164* (2013.01); *G06T 2207/30168* (2013.01)

(58) Field of Classification Search
CPC .. G06T 7/001; G06T 7/74; G06T 7/90; G06T 2207/30164; G06T 2207/30168; H04N 9/646
See application file for complete search history.

(56) References Cited

U.S. PATENT DOCUMENTS

| | | | |
|---|---|---|---|
| 10,322,483 B2 * | 6/2019 | Kawanishi | G01B 11/08 |
| 11,711,615 B2 * | 7/2023 | Obara | H04N 23/695 |
| | | | 348/128 |
| 2011/0187887 A1 * | 8/2011 | Inoue | G06T 5/006 |
| | | | 348/222.1 |

(Continued)

FOREIGN PATENT DOCUMENTS

| | | | | |
|---|---|---|---|---|
| AU | 2014270403 A1 * | 11/2015 | ........... | G06T 15/506 |
| DE | 102018109774 B4 * | 6/2019 | ............ | B25J 9/1697 |

(Continued)

*Primary Examiner* — Pinalben Patel
(74) *Attorney, Agent, or Firm* — Sughrue Mion, PLLC

(57) ABSTRACT

A color tone correction system includes a reception unit that receives a target workpiece image and design information of a target workpiece, a reference image data storage unit that stores a reference workpiece image, an image determination unit that determines whether or not the target workpiece is inclined more than the reference workpiece, a calculation processing unit that estimates an inclination angle of the target workpiece based on the stored reference workpiece image and the target workpiece image, a color tone data storage unit that stores a relationship between the inclination angle and a color tone correction value, an image correction unit that corrects a color tone of the target workpiece image based on the estimated inclination angle and a color tone correction formula corresponding to the stored relationship, and an output unit that outputs the corrected target workpiece image.

2 Claims, 14 Drawing Sheets

(56) References Cited

U.S. PATENT DOCUMENTS

| | | | | |
|---|---|---|---|---|
| 2014/0340508 A1* | 11/2014 | Yamamoto | ......... | B23Q 17/2233 |
| | | | | 348/94 |
| 2015/0002672 A1* | 1/2015 | Hayakawa | ............. | G06V 20/56 |
| | | | | 348/148 |
| 2015/0262012 A1* | 9/2015 | Kim | ..................... | G06V 10/255 |
| | | | | 382/103 |
| 2021/0252791 A1* | 8/2021 | Simon | ..................... | B22F 12/90 |
| 2023/0041378 A1* | 2/2023 | Abouelela | .......... | G06V 10/7715 |

FOREIGN PATENT DOCUMENTS

| JP | 2005-159650 A | 6/2005 |
|---|---|---|
| JP | 2017-072945 A | 4/2017 |

* cited by examiner

COLOR TONE CORRECTION SYSTEM AND COLOR TONE CORRECTION METHOD

CROSS REFERENCE TO RELATED APPLICATIONS

This application is based upon and claims the benefit of priority from Japanese patent application No. 2020-134738, filed on Aug. 7, 2020, the disclosure of which is incorporated herein in its entirety by reference.

BACKGROUND

The present disclosure relates to a color tone correction system and a color tone correction method.

In a process of manufacturing vehicles or the like, when a component is assembled to a workpiece, inspection work is performed to photograph the assembled component in the workpiece and determine a component assembling position using the photographed image. In this work, it is usually necessary to use a satisfactory image in order for an inspector to determine the component assembling position by looking at the image. As a technique related to image processing, for example, Japanese Unexamined Patent Application Publication Nos. 2017-072945 and 2005-159650 are known.

SUMMARY

However, in a system for the inspection work, when the component assembling position in the workpiece is determined based on the image, there is a problem that it is not possible to detect a wrong/missing component at the manufacturing site, because the color tone (including any of characteristics of the color to be visually recognizable) of the component in the image changes according to an inclination of the workpiece.

This is caused by a change in a distance from a light source and an angle with respect to the light source in any of the components on the workpiece due to the inclination of the workpiece. Since an illuminance and a reflectance of incident light change with the inclination of the workpiece, the color tone of the component changes according to the inclination of the workpiece. Therefore, the color tone of the workpiece becomes different from the reference color only by looking at the workpiece in the image, and it is difficult to make a discrimination of the component and to detect a wrong/missing component.

On the other hand, Japanese Unexamined Patent Application Publication No. 2017-072945 discloses a technique in which a photographed image of a subject is acquired, color correction information for performing color correction to cancel color characteristics is generated based on the color characteristics of the image displayed on a display unit when the image is photographed, and the photographed image is corrected based on the color correction information. Japanese Unexamined Patent Application Publication No. 2005-159650 discloses a technique in which an image obtained by photographing a subject with a photographing apparatus is processed to generate a gradation conversion table representing a relationship between value (brightness) and density, and the image is corrected based on the gradation conversion table. However, in these related techniques, color correction cannot be performed by the same light source, and the color correction cannot be performed according to inclination of the subject.

The present disclosure has been made in view of such circumstances and provides a color correction system and a color correction method capable of preventing or minimizing a change in a color tone of an image due to inclination of a workpiece.

An example aspect of the present disclosure is a color tone correction system for image determination when a component assembling position of a workpiece is determined from an image. The color tone correction system includes: a reception unit configured to receive a target workpiece image obtained by photographing a target workpiece and design information of the target workpiece; a reference workpiece image storage unit configured to store a reference workpiece image obtained by photographing a reference workpiece; an image determination unit configured to determine whether or not the target workpiece is inclined more than the reference workpiece based on the received target workpiece image and the received design information; a calculation processing unit configured to estimate an inclination angle of the target workpiece based on the stored reference workpiece image and the target workpiece image when it is determined that the target workpiece is inclined; a color tone data storage unit configured to store a relationship between the inclination angle and a color tone correction value; an image correction unit configured to correct a color tone of the target workpiece image based on the estimated inclination angle and a color tone correction formula corresponding to the stored relationship; and an output unit configured to transmit and/or display the corrected target workpiece image.

In this example aspect, the calculation processing unit may be configured to compare the reference workpiece image with the target workpiece image, and estimate the inclination angle of the target workpiece based on a difference between a contour of the reference workpiece and a contour of the target workpiece and a spectrum diffraction quantity of each vertex.

Further, the calculation processing unit may be configured to calculate a coordinate of a point of the target workpiece in a direction of a first axis based on an illuminance of a point of the reference workpiece and an illuminance of a point of the target workpiece, and estimate the inclination angle of the target workpiece around the first axis from the calculated coordinate.

Further, the calculation processing unit may be configured to estimate the inclination angles around a second axis and a third axis of the target workpiece based on the inclination angle around the first axis, a three-dimensional coordinate of a point of the reference workpiece, and the three-dimensional coordinate of the point of the target workpiece.

An example aspect of the present disclosure is a color tone correction method for image determination when a component assembling position of a workpiece is determined from an image. The color tone correction method includes: receiving a target workpiece image obtained by photographing a target workpiece and design information of the target workpiece; storing a reference workpiece image obtained by photographing a reference workpiece; determining whether or not the target workpiece is inclined more than the reference workpiece based on the received target workpiece image and the received design information; estimating an inclination angle of the target workpiece based on the stored reference workpiece image and the target workpiece image when it is determined that the target workpiece is inclined; storing a relationship between the inclination angle and a color tone correction value; correcting a color tone of the target workpiece image based on the estimated inclination angle and a color tone correction formula corresponding to the stored relationship; and transmitting and/or displaying the corrected target workpiece image.

According to the present disclosure, it is possible to provide a color correction system and a color correction method capable of preventing or minimizing a change in a color tone of an image due to inclination of a workpiece.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

An embodiment of the present disclosure will be described below with reference to the drawings. However, the present disclosure is not limited to the following embodiment. For clarity of description, the following descriptions and drawings have been omitted and simplified as appropriate. In each of the drawings, the same elements are denoted by the same reference signs, and repeated description thereof is omitted if necessary.

Figure 1:
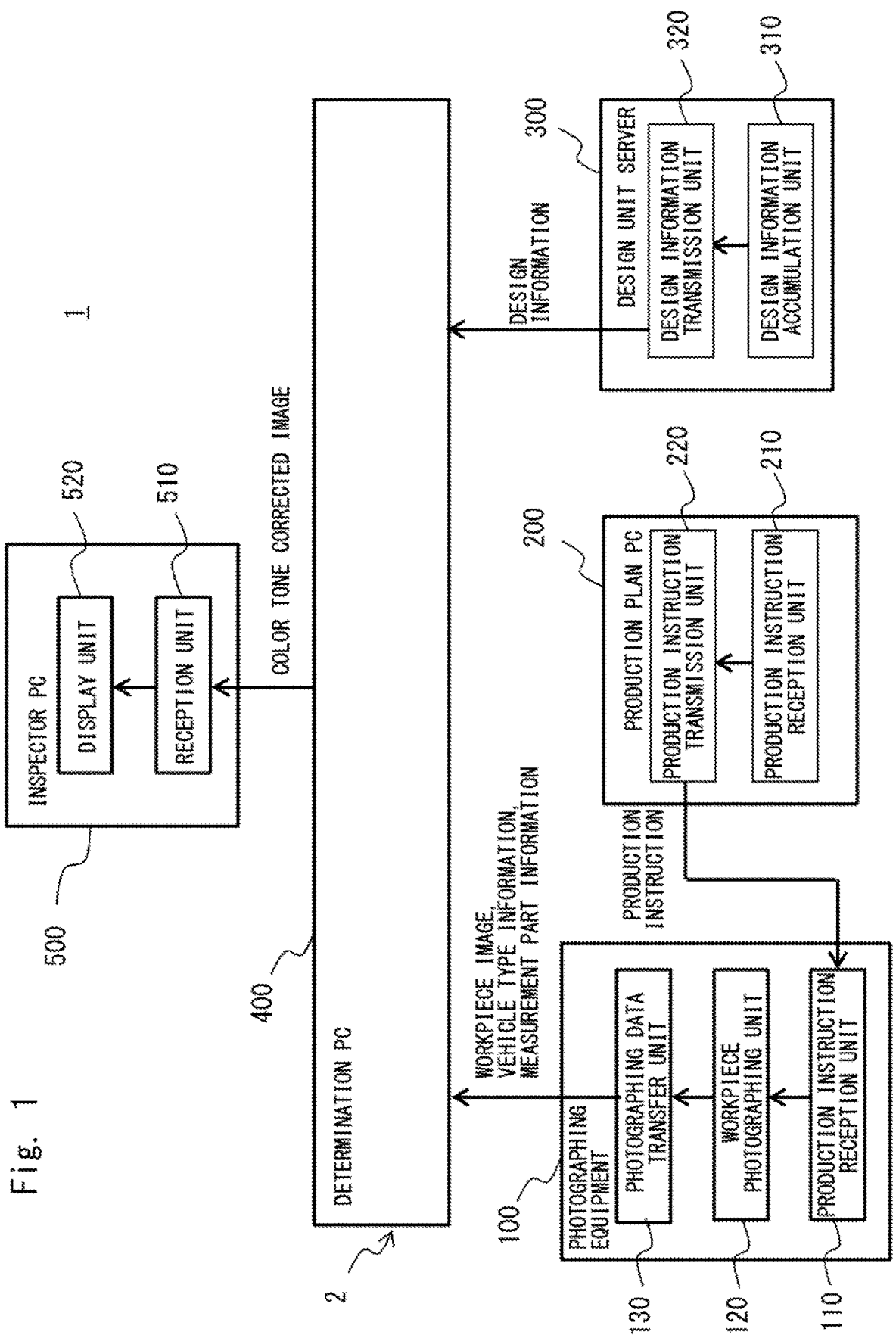
FIG. 1 is a block diagram showing a schematic configuration of a workpiece inspection system according to an embodiment of the present disclosure.
Figure 2:
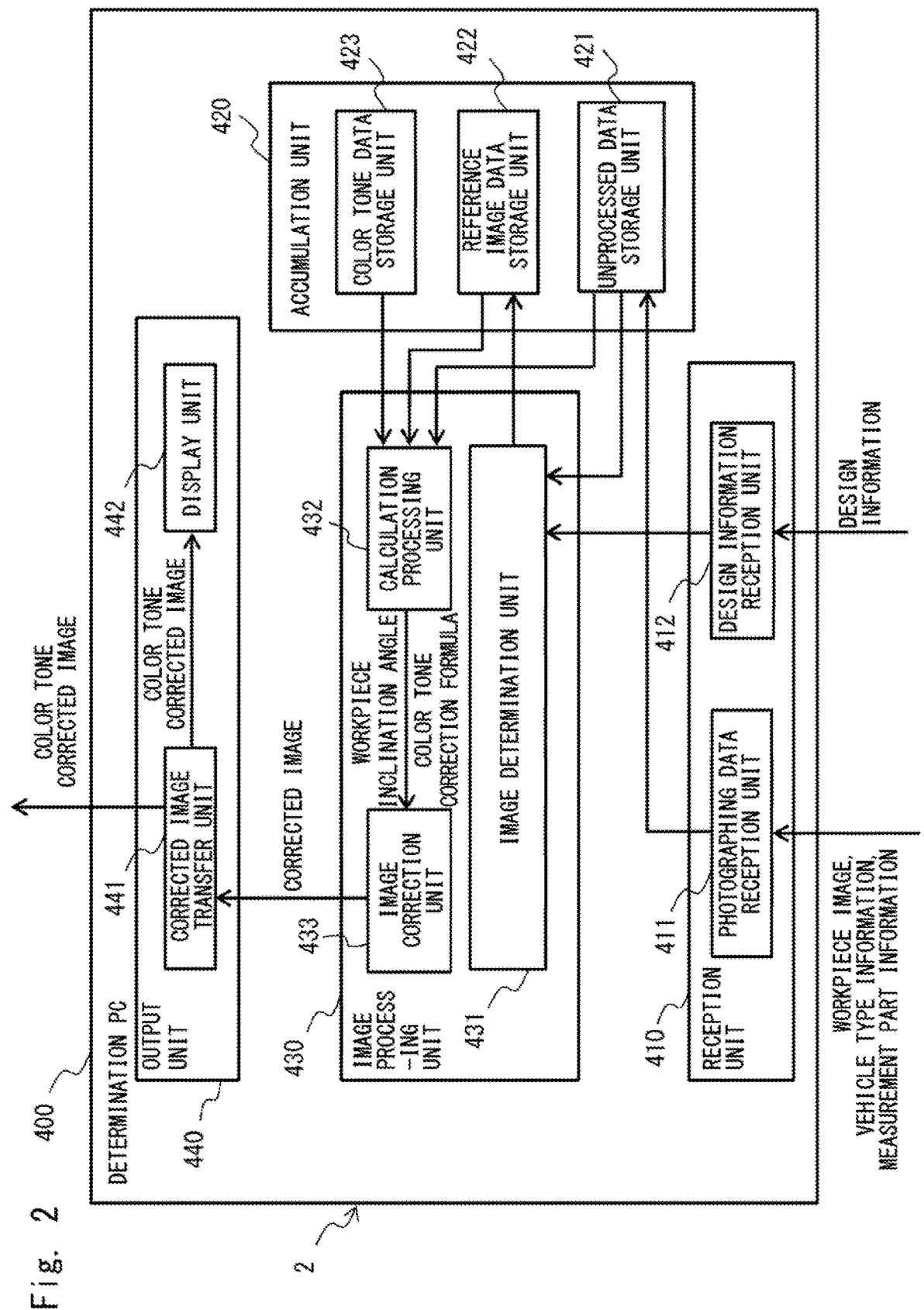
FIG. 2 is a block diagram showing a schematic configuration of a color tone correction system according to the embodiment of the present disclosure.

FIG. 1 is a block diagram showing a schematic configuration of a workpiece inspection system according to the embodiment of the present disclosure. FIG. 2 is a block diagram showing a schematic configuration of a color tone correction system (value/color tone correction system) included in the workpiece inspection system. The workpiece inspection system 1 according to this embodiment inspects a component assembling state of a workpiece based on a workpiece image obtained by photographing the workpiece to which components (parts) are assembled. The color tone correction system 2 (a determination PC 400) corrects the color tone of the workpiece image according to the inclination of the workpiece in the workpiece inspection system 1. The workpiece according to this embodiment is, for example, a workpiece used for manufacturing a vehicle, but it is not limited to a vehicle and may be a workpiece of any product.

As shown in FIG. 1, the workpiece inspection system 1 includes photographing equipment 100, a production plan PC 200, a design unit server 300, a determination PC 400, and an inspector PC 500. The photographing equipment 100, the production plan PC 200, the design unit server 300, the determination PC 400, and the inspector PC 500 are connected via a communication network such as a LAN (Local Area Network) so that communication is possible among them.

The photographing equipment 100 is equipment (system) for photographing a workpiece to which components are assembled in response to a production instruction. The photographing equipment 100 includes a production instruction reception unit 110, a workpiece photographing unit 120, and a photographing data transfer unit 130. The production instruction reception unit 110, the workpiece photographing unit 120, and the photographing data transfer unit 130 may be composed of separate apparatuses, or the functions required for the photographing equipment 100 may be implemented by one or more apparatuses.

The production instruction reception unit 110 receives the production instruction for the workpiece from the production plan PC 200. The production instruction is an instruction for producing the workpiece and also a photographing instruction for photographing the workpiece to be produced. The production instruction reception unit 110 may be an information processing apparatus such as a PC (Personal Computer) or a tablet terminal, or may be a photographing device such as the same camera as the workpiece photographing unit 120.

The workpiece photographing unit 120 is a photographing device (a photographing unit) such as a camera for photographing (imaging) the workpiece. The workpiece photographing unit 120 is fixed to a predetermined position near a workpiece assembling apparatus, photographs the workpiece to which components are assembled in response to reception of the production instruction, and generates a two-dimensional workpiece image including the workpiece.

The photographing data transfer unit 130 is a transmission unit for transmitting (i.e., transferring) the photographing data to the determination PC 400. In this example, as the photographing data, the workpiece image photographed by the workpiece photographing unit 120, vehicle type information of the workpiece, and measurement part information of the workpiece are transmitted. The vehicle type information is information indicating a vehicle type to be manufactured by the workpiece (e.g., the type of vehicle or the model of vehicle), and the measurement part information is information indicating a part (e.g., a part of a vehicle or a position of a part in a vehicle) of the workpiece. The vehicle type information and the measurement part information are also workpiece information for identifying the workpiece. The vehicle type information and the measurement part information may be set in advance, or may be acquired from the workpiece assembling apparatus or the like when the workpiece is photographed. When the workpiece photographing unit 120 photographs the workpiece, the photographing data transfer unit 130 transmits the photographed workpiece image, the vehicle type information, and the measurement part information to the determination PC 400. The photographing data transfer unit 130 may be an information processing apparatus such as a PC or a server, or may be another transmission apparatus.

The production plan PC 200 manages a production plan of a vehicle or the like and instructs production of a workpiece. The production plan PC 200 includes a production instruction reception unit 210 and a production instruction transmission unit 220. The production plan PC 200 is composed of, for example, an information processing apparatus such as a PC or a server, and instead functions necessary for the production plan PC 200 may be implemented by a plurality of apparatuses.

The production instruction reception unit 210 receives the production instruction for the workpiece. For example, the production instruction reception unit 210 receives (receipts or accepts) the production instruction by being input or receiving it. That is, the production instruction reception unit 210 may be an input apparatus for an input operation of a manager to input the production instruction or a reception apparatus (receiving apparatus) for receiving the production instruction from another apparatus.

The production instruction transmission unit 220 transmits a production instruction to the photographing equipment 100. When the production instruction reception unit 210 receives the production instruction, the production instruction transmission unit 220 transmits the received production instruction to the photographing equipment 100 and other apparatuses.

The design unit server 300 manages design information of workpieces and components of, for example, vehicles, and transmits the design information in response to requests from other apparatuses or the like. The design unit server 300 includes a design information accumulation unit 310 and a design information transmission unit 320. The design unit server 300 is composed of, for example, an information processing apparatus such as a server or a PC, and instead functions necessary for the design unit server 300 may be implemented by a plurality of apparatuses.

The design information accumulation unit 310 accumulates the design information of workpieces and components. The design information accumulation unit 310 may be a storage apparatus or a database inside or outside the design unit server 300, or may be a storage area in the storage apparatus. The design information transmission unit 320 transmits the design information to the determination PC 400. In response to a request from the determination PC 400, the design information transmission unit 320 transmits the design information of the relevant workpiece or component stored in the design information accumulation unit 310 to the determination PC 400.

The determination PC 400 is an apparatus for determining an inclination of the workpiece image and correcting the color tone. The color tone correction system 2 according to this embodiment is composed of, for example, the determination PC 400, but other apparatuses and functions may be provided as necessary. As shown in FIG. 2, the determination PC 400 includes a reception unit 410, an accumulation unit 420, an image processing unit 430, and an output unit 440. The determination PC 400 is composed of, for example, an information processing apparatus such as a PC or a server, and instead functions necessary for the determination PC 400 may be implemented by a plurality of apparatuses.

The reception unit 410 receives information from the photographing equipment 100 and the design unit server 300. The reception unit 410 includes a photographing data reception unit 411 and a design information reception unit 412. The photographing data reception unit 411 receives the workpiece image, the vehicle type information, and the measurement part information transmitted from the photographing equipment 100. The design information reception unit 412 receives the design information of the workpiece transmitted from the design unit server 300.

The accumulation unit 420 is an accumulation unit (storage unit) that accumulates data necessary for processing the workpiece images. The accumulation unit 420 may be a storage apparatus or a database inside or outside the determination PC 400, or may be a storage area in the storage apparatus. The accumulation unit 420 includes an unprocessed data storage unit 421, a reference image data storage unit 422, and a color tone data storage unit 423.

The unprocessed data storage unit 421 stores the workpiece image, the vehicle type information, and the measurement part information received by the photographing data reception unit 411 from the photographing equipment 100. The unprocessed data stored in the unprocessed data storage unit 421 is data before or during processing by the image processing unit 430. The workpiece image of the unprocessed data includes a reference workpiece image and an inspection target workpiece image. The reference workpiece image is an image obtained by photographing the workpiece (a reference workpiece) in a reference state (the workpiece not inclined) before inspection, and is an image serving as a reference for inclination and correction. The inspection target workpiece image is an image obtained by photographing the inspection target workpiece (the inspection target workpiece) at the time of inspection. Either or both of the inspection target workpiece image and the reference workpiece image may be referred to as a workpiece image. The reference image data storage unit 422 stores the reference workpiece image. The reference image data storage unit 422 stores, for example, an image decided by the image processing unit 430 to be the reference workpiece image. Alternatively, the reference image data storage unit 422 may directly store an image received from the photographing equipment 100. The color tone data storage unit 423 stores a relation between a workpiece inclination angle and color tone data (color tone correction value) learned in advance.

The image processing unit 430 determines and corrects the workpiece image. The image processing unit 430 includes an image determination unit 431, a calculation processing unit 432, and an image correction unit 433. The image determination unit 431 determines whether or not the workpiece of the workpiece image stored in the unprocessed data storage unit 421 is inclined based on the design information received from the design unit server 300. For example, the image determination unit 431 determines whether or not the inspection target workpiece is inclined more than the reference workpiece. The image determination unit 431 may determine the presence or absence of the inclination of the inspection target workpiece of the inspection target workpiece image based on the reference workpiece of the reference workpiece image.

The calculation processing unit 432 estimates the workpiece inclination angle of an inspection target workpiece based on reference workpiece image stored in a reference image data storage unit 422 and an inspection target workpiece image stored in the unprocessed data storage unit 421.

The calculation processing unit 432 estimates the workpiece inclination angle of the inspection target workpiece when the image processing unit 430 determines that the inspection target workpiece is inclined. The workpiece inclination angle is a three-dimensional inclination (the inclination angle) of the inspection target workpiece with respect to the reference workpiece. The calculation processing unit 432 obtains a color tone correction formula based on a relationship between the workpiece inclination angle and the color tone data stored in the color tone data storage unit 423. The image correction unit 433 corrects the color tone of the inspection target workpiece image using the estimated workpiece inclination angle and the color tone correction formula.

The output unit 440 transmits or outputs, as a display, a color tone corrected image whose color tone has been corrected. The output unit 440 includes a corrected image transfer unit 441 and a display unit 442. The output unit 440 may include both the corrected image transfer unit 441 and the display unit 442, or may include one of them. The corrected image transfer unit 441 is a transmission unit that transmits the color tone corrected image to the inspector PC 500. The display unit 442 is a display apparatus such as a liquid crystal display apparatus that displays the image after the color tone correction. Note that the image before correction and the image after correction may be output. The reference workpiece image may be output together with the inspection target workpiece image. For example, the image may be output in such a way that the the presence or absence of the inclination of the workpiece and the inclination angle are displayed.

The inspector PC 500 is an apparatus whereby an inspector performs inspection based on the displayed workpiece image. As shown in FIG. 1, the inspector PC 500 includes a reception unit 510 and a display unit 520. The inspector PC 500 is composed of, for example, an information processing apparatus such as a PC or a server, and instead functions necessary for the inspector PC may be implemented by a plurality of apparatuses. The reception unit 510 receives the color tone corrected image from the determination PC 400. The display unit 520 is a display apparatus such as a liquid crystal display apparatus that displays the received color tone corrected image.

Figure 3:
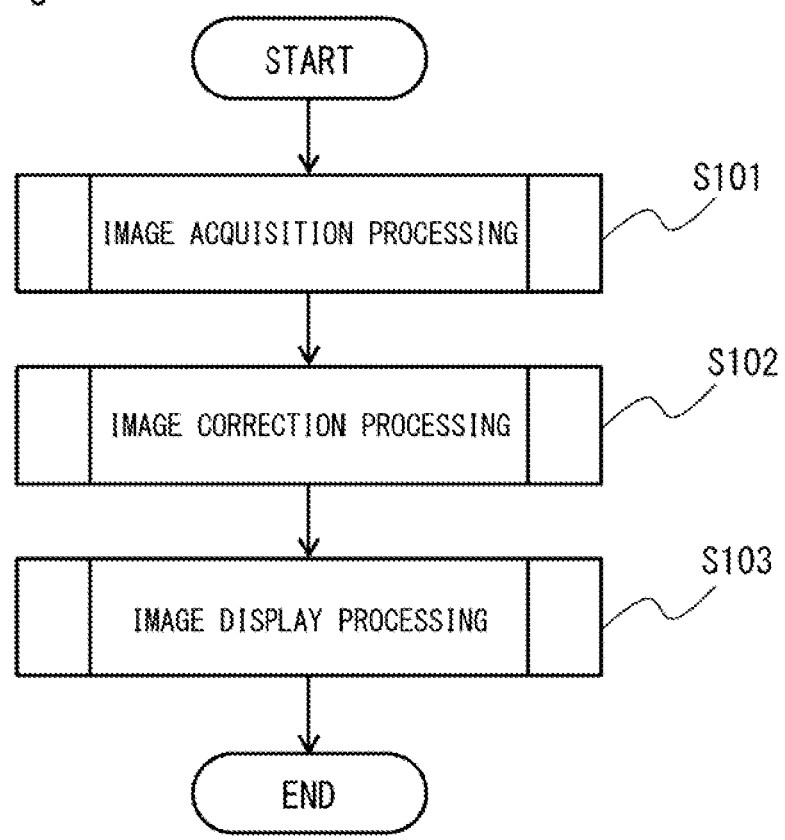
FIG. 3 is a flowchart showing a processing flow of the workpiece inspection system according to the embodiment of the present disclosure.

FIG. 3 is a flowchart showing a processing flow of the workpiece inspection system 1 according to this embodiment. As shown in FIG. 3, the workpiece inspection system 1 performs processing in the order of image acquisition processing for acquiring the workpiece image (S101), image correction processing for correcting the acquired workpiece image (S102), and image display processing for displaying the corrected workpiece image (S103).

Figure 4:
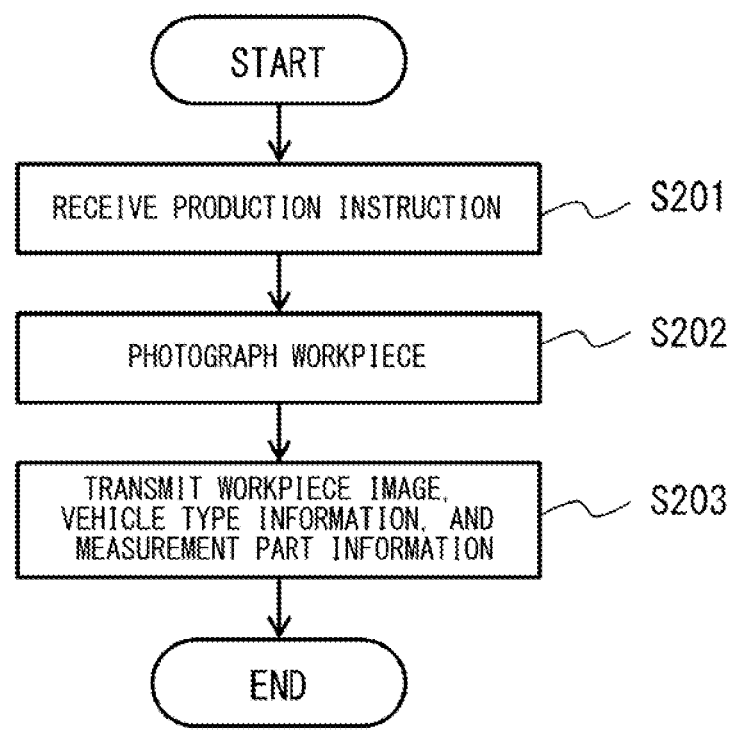
FIG. 4 is a flowchart showing a processing flow of image acquisition processing according to the embodiment of the present disclosure.

First, the image acquisition processing in S101 will be described. FIG. 4 is a flowchart showing a processing flow of the image acquisition processing. The image acquisition processing is executed by the photographing equipment 100. By this processing, when the photographing equipment 100 photographs the reference workpiece in advance, the determination PC 400 acquires the reference workpiece image. After that, when the photographing equipment 100 photographs the inspection target workpiece, the determination PC 400 acquires the inspection target workpiece image.

As shown in FIG. 4, the production instruction reception unit 110 receives the production instruction from the production plan PC 200 (S201). When the production plan PC 200 transmits the production instruction for the workpiece, the production instruction reception unit 110 receives the production instruction (the photographing instruction) for the workpiece transmitted from the production plan PC 200.

Next, the workpiece photographing unit 120 photographs the workpiece (S202). When the production instruction reception unit 110 receives the production instruction for the workpiece, the workpiece photographing unit 120 photographs the workpiece to which the components are assembled. For example, the workpiece assembling apparatus assembles components to the workpiece in response to the production instruction, and the workpiece photographing unit 120 photographs the workpiece in which the component assembly is completed to generate the workpiece image.

Next, the photographing data transfer unit 130 transmits the workpiece image, the vehicle type information, and the measurement part information to the determination PC 400 (S203). When the workpiece photographing unit 120 photographs the workpiece image, the photographing data transfer unit 130 acquires the vehicle type information and the measurement part information (the workpiece information) of the photographed workpiece, and transmits the workpiece image, the vehicle type information, and the measurement part information to the unprocessed data storage unit 421 of the determination PC 400. Then, the unprocessed data storage unit 421 of the determination PC 400 receives and stores the workpiece image, the vehicle type information, and the measurement part information via the photographing data reception unit 411.

Figure 5:
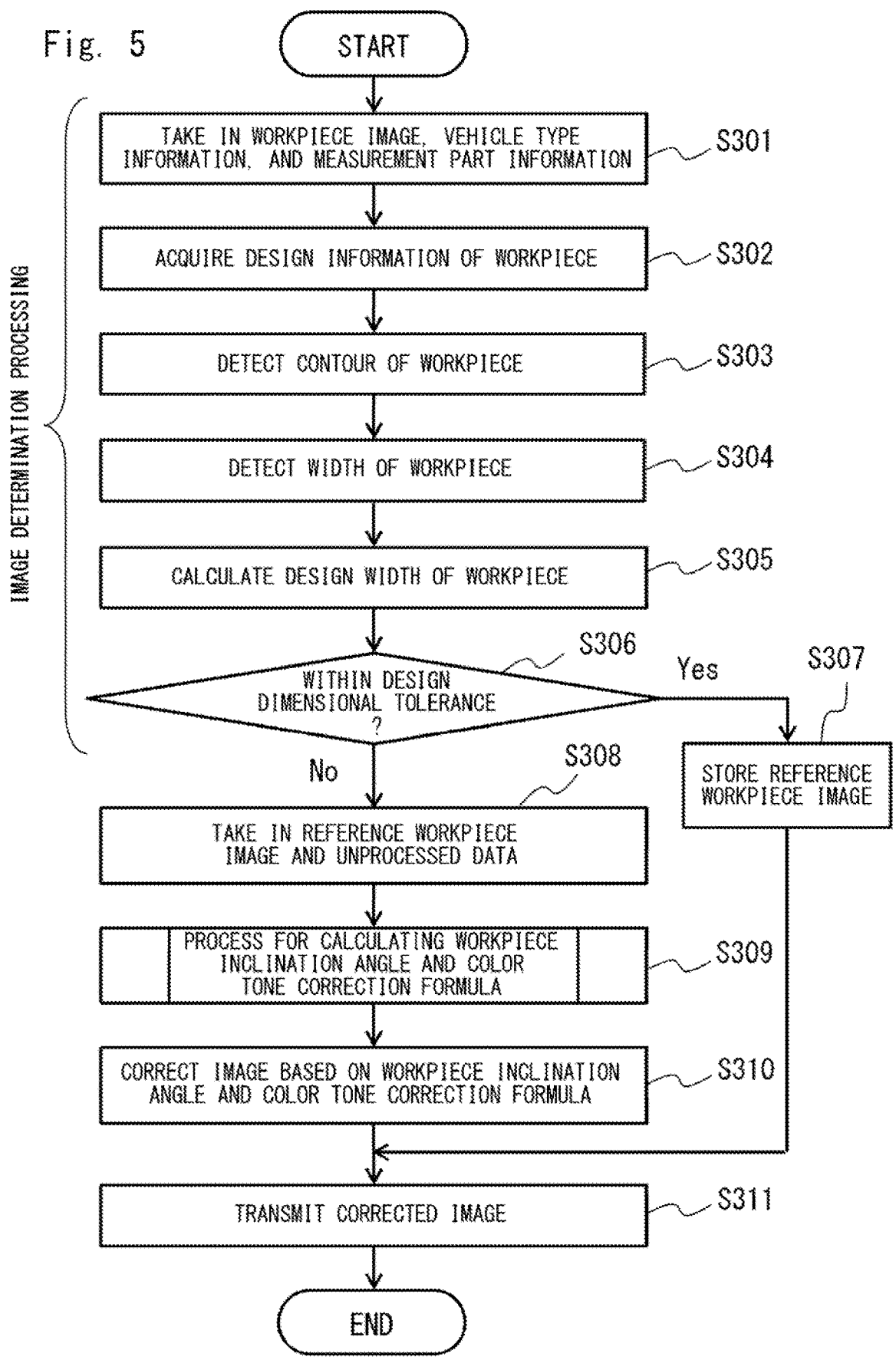
FIG. 5 is a flowchart showing a processing flow of image correction processing according to the embodiment of the present disclosure.

Next, the image correction processing in S102 shown in FIG. 3 will be described. FIG. 5 is a flowchart showing a processing flow of the image correction processing. This image correction processing is executed by the determination PC 400. By this processing, the reference workpiece image is compared with the inspection target workpiece, the workpiece inclination angle is estimated based on a difference between the contour of the inspection target workpiece and that of the reference workpiece and a spectrum diffraction quantity of each vertex, and then the color tone of a component due to the inclination of the workpiece is corrected.

As shown in FIG. 5, the image determination unit 431 takes in the workpiece image, the vehicle type information, and the measurement part information (S301). The image determination unit 431 takes in the workpiece image acquired from the photographing equipment 100 and stored in the unprocessed data storage unit 421, the vehicle type information, and the measurement part information.

Next, the image determination unit 431 acquires the design information of the relevant workpiece from the design unit server 300 (S302). The image determination unit 431 acquires dimension information of the workpiece of the photographed workpiece image from the design information accumulation unit 310 in the design unit server 300 via the design information reception unit 412. Specifically, the image determination unit 431 requests the design unit server 300 for the design information of the workpiece corresponding to the vehicle type information and the measurement part information taken in together with the workpiece image, and acquires the dimension information of the relevant work.

Next, the image determination unit 431 detects the contour of the workpiece of the workpiece image (S303). For example, the image determination unit 431 performs edge detection processing on the workpiece image taken in to extract the contour of the workpiece (a workpiece area) in the image. The workpiece area in the image may be referred to as the workpiece image.

Figure 6:
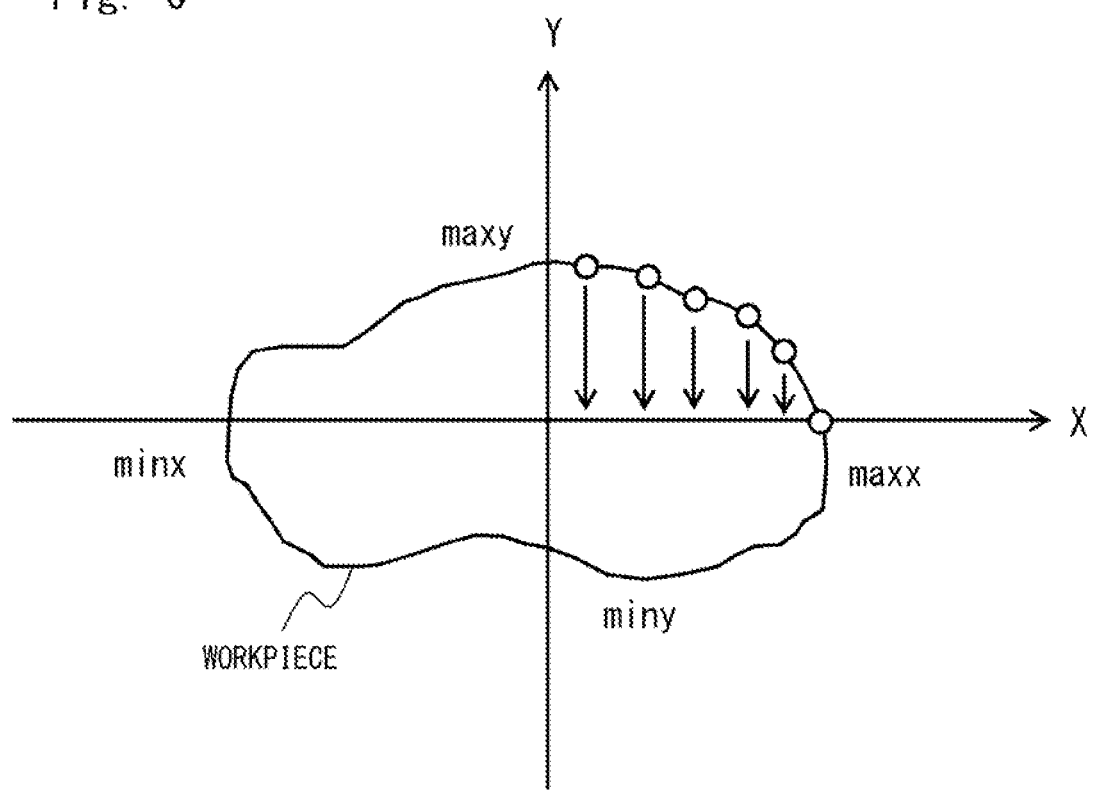
FIG. 6 shows an example of detection of a width of a workpiece.

Next, the image determination unit 431 detects the widths (detection sizes) of the workpiece of the workpiece image in the X-axis direction and the Y-axis direction (S304). For example, as shown in FIG. 6, the image determination unit 431 obtains a maximum value (max x) and a minimum value (min x) of the X coordinate of each point along the contour of the detected workpiece (the workpiece area), and calculates a detection width ($x_m$) in the X-axis direction by summing the maximum value and the minimum value of the X coordinate as in the following Formula (1). Likewise, the image determination unit 431 obtains a maximum value (max y) and a minimum value (min y) of the Y coordinate of each point along the contour of the detected workpiece, and calculates a detection width ($y_m$) in the Y-axis direction by summing the maximum value and the minimum value of the Y coordinate as in the following Formula (1).

[Formula 1]

$$x_m = |\max x + \min x|$$

$$y_m = |\max y + \min y| \quad (1)$$

Next, the image determination unit 431 calculates design widths (design sizes) in the X-axis direction and the Y-axis direction of the workpiece in the image based on the design information (S305). The image determination unit 431 obtains a design width ($x_d$) in the X-axis direction and a design width ($y_d$) in the Y-axis direction of the workpiece (the workpiece area) in the image based on the dimension information which is the design information of the relevant workpiece. For example, using a camera parameter of the workpiece photographing unit 120 for photographing the workpiece, a dimension of the workpiece in a design drawing in the X-axis direction and a dimension of the workpiece in the design drawing in the Y-axis direction are converted into a width of the workpiece in the X-axis direction and a width of the workpiece in the Y-axis direction in the image. Note that the widths of the workpiece of the reference workpiece image may be used instead of the design widths.

Next, the image determination unit 431 determines whether the difference between the detection widths of the workpiece and the design widths of the workpiece is within a design dimensional tolerance (S306). In this way, it is determined whether or not the photographed workpiece is inclined. The image determination unit 431 determines whether the difference between the detection width ($x_m$) of the workpiece in the X-axis direction in the workpiece image and the design width ($x_d$) is within a design dimensional tolerance ($h_x$), and whether a difference between the detection width ($y_m$) of the workpiece in the Y-axis direction in the workpiece image and the design width ($y_d$) is within a design dimensional tolerance ($h_y$). Specifically, it is determined whether or not the following Formulas (2) are satisfied. In the Formulas (2), $h_x$ and $h_y$ ($h_x$ and $h_y$ with a bar symbol) are the average values of the design dimensional tolerances in the X-axis direction and the Y-axis direction.

[Formula 2]

$$-\overline{h_x} \le x_d - x_m \le \overline{h_x}$$

$$-\overline{h_y} \le y_d - y_m \le \overline{h_y} \quad (2)$$

For example, when one of the Formulas (2) is not satisfied, it is determined that the workpiece is inclined (inclined with respect to the reference), while when both the Formulas (2) are satisfied, it is determined that the workpiece is not inclined (not inclined with respect to the reference). In S306, when the differences between the detection widths and the design widths of the workpiece are within the design dimensional tolerances (no inclination), the determined workpiece image is stored as the reference workpiece image in the reference image data storage unit 422 (S307). For example, after the workpiece image is stored as the reference workpiece image, the image is output without performing correction from S311 onward. If necessary, the correction processing of S308 to S310 may be performed.

Figure 7:
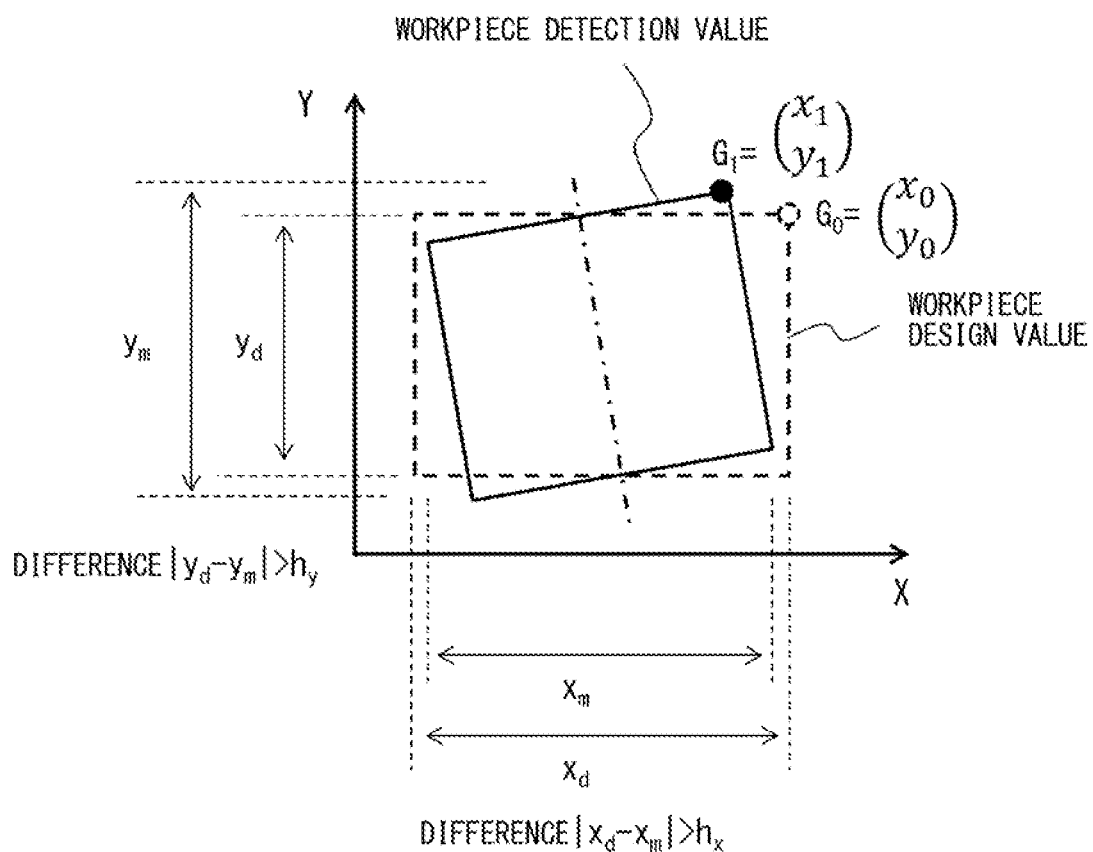
FIG. 7 shows an example of image determination when the workpiece is inclined.

The above-described S301 to S306 are image determination processing for determining the presence or absence of the inclination of the workpiece photographed by the image determination unit 431 based on the workpiece image. FIG. 7 shows an example of the image determination processing when the workpiece is inclined in the X-axis, Y-axis, and Z-axis directions. In this example, the shape of the workpiece is square in the X-Y plane (a plane view from the camera) of the image, but it is not limited to a square, and instead any shape may be used. The shape in the Z-axis direction is also not limited.

As shown in FIG. 7, the difference between the line segment of the detection value and that of the design value of the workpiece in the X-axis direction in the photographed workpiece image and the difference between the line segment of the detection value and that of the design value of the workpiece in the Y-axis direction are calculated based on the detection values and the design values of the photographed workpiece image. That is, in the image determination processing, as described above, the difference between the design width ($x_d$) and the detection width ($x_m$) is obtained. The design width ($x_d$) is the length of the line segment of the workpiece in the X-axis direction in the image obtained from the design information, and the detection width ($x_m$) is the length of the line segment of the workpiece in the X-axis direction detected from the workpiece image. Likewise, the difference between the design width ($y_d$) and the detection width ($y_m$) is obtained. The design width ($x_d$) is the length of the line segment of the workpiece in the Y-axis direction in the image obtained from the design information, and the detection width ($y_m$) is the length of the line segment of the workpiece in the Y-axis direction detected from the workpiece image.

In the example of FIG. 7, the difference ($x_d - x_m$) in consideration of an image scale ratio is larger than the design dimensional tolerance ($h_x$) in the X-axis direction, and the difference ($y_d - y_m$) in consideration of the image scale ratio is larger than the design dimensional tolerance ($h_y$) in the Y-axis direction. Therefore, it is determined that the photographed workpiece is inclined. In this case, in the subsequent processing, the coordinates of a point (e.g., $G_0$ and $G_1$) shifted due to the inclination are acquired, and the three-dimensional inclination is obtained using the coordinates to perform the color tone correction.

Figure 8:
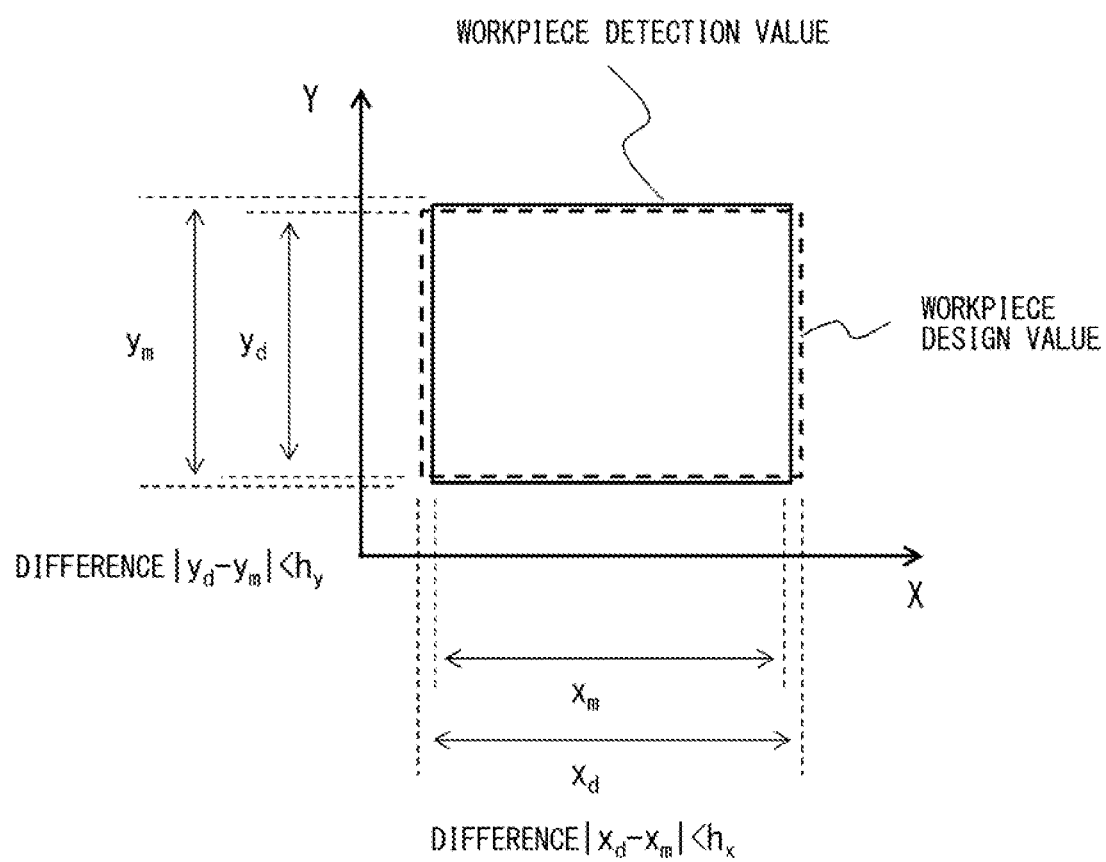
FIG. 8 shows an example of image determination when the workpiece is not inclined.

FIG. 8 shows an example of the image determination processing when the workpiece is not inclined. As in FIG. 7, the difference between the design width ($x_d$) of the workpiece in the X-axis direction and the detection width ($x_m$) of the workpiece is obtained, and the difference between the design width ($y_d$) of the workpiece in the Y-axis direction and the detection width ($y_m$) of the workpiece is obtained. In the example of FIG. 8, the difference ($x_d - x_m$) in consideration the image scale ratio falls within the design dimensional tolerance ($h_x$) in the X-axis direction, and the difference ($y_d - y_m$) in consideration of the image scale ratio falls within the design dimensional tolerance ($h_y$) in the Y-axis direction. Therefore, it is determined that the photographed workpiece is not inclined. In this case, the color tone correction is not performed in the subsequent processing.

As shown in FIG. 5, when it is determined in S306 that the differences between the detection widths of the workpiece and the design widths are larger than the design dimensional tolerances (the workpiece is inclined), the calculation processing unit 432 performs the color tone correction in the following S308 to S310. First, the calculation processing unit 432 takes in the reference workpiece image and the unprocessed data (S308). The unprocessed data in this case is the inspection target workpiece image. That is, the calculation processing unit 432 takes in the reference workpiece image stored in the reference image data storage unit 422 and the inspection target workpiece image stored in the unprocessed data storage unit 421.

Figure 9:
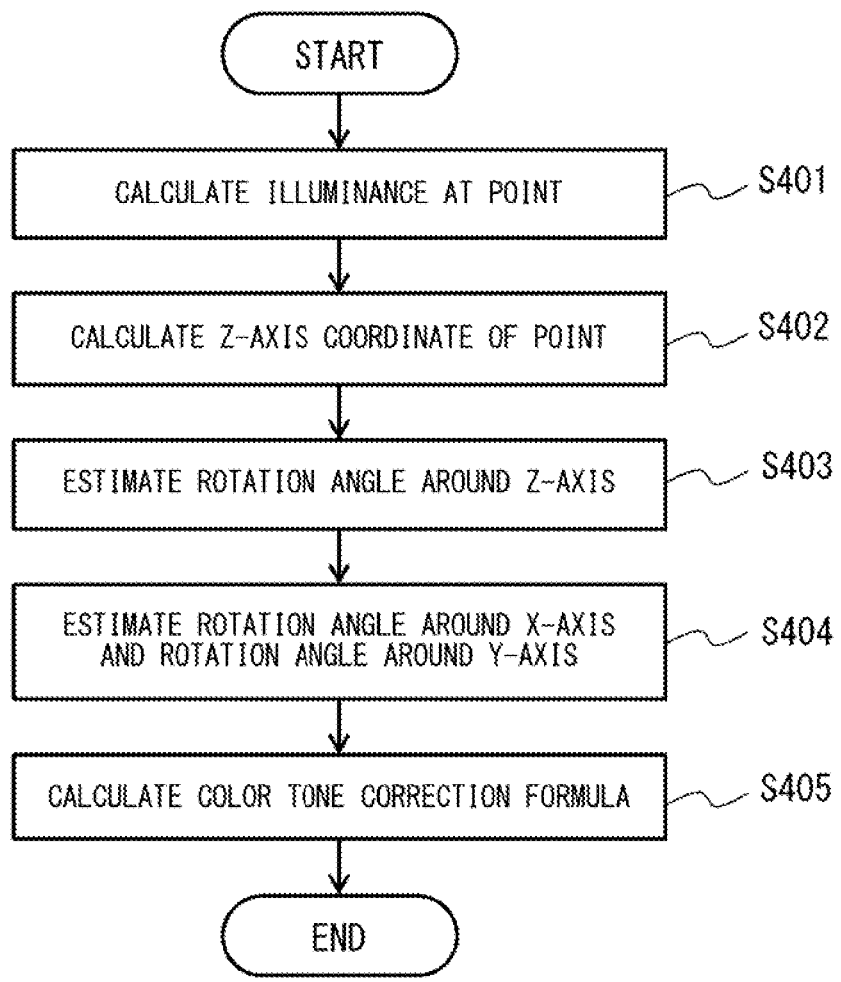
FIG. 9 is a flowchart showing a processing flow of processing for calculating a workpiece inclination angle and a color tone correction formula according to the embodiment of the present disclosure.

Next, the calculation processing unit 432 performs processing for calculating the workpiece inclination angle and color tone correction formula (S309). FIG. 9 is a flowchart showing a processing flow of the processing for calculating the workpiece inclination angle and the color tone correction formula (S309).

Figure 10:
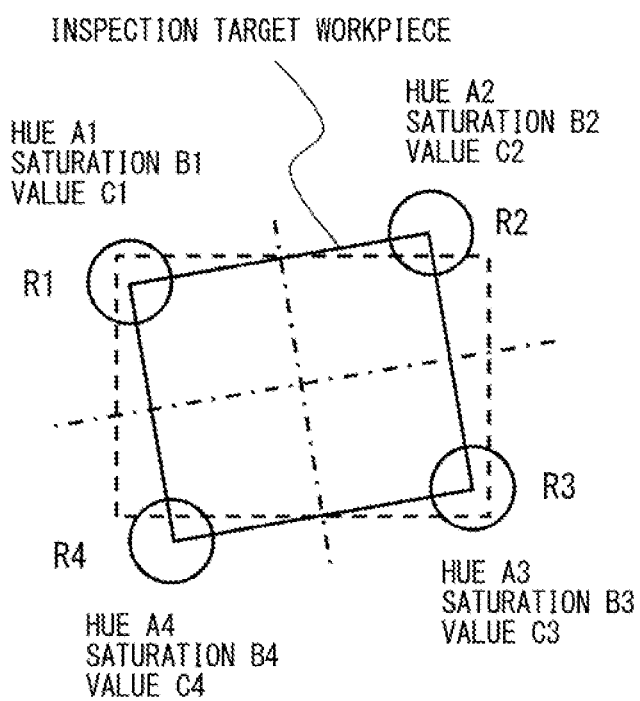
FIG. 10 shows an example of calculation of an illuminance of an image.

As shown in FIG. 9, the calculation processing unit 432 calculates an illuminance at a point (any of the points) of the inspection target workpiece (S401). The calculation processing unit 432 extracts the workpiece (the workpiece area) of the inspection target workpiece image and specifies the point along the contour of the extracted workpiece. As the point, for example, as shown in FIG. 10, the calculation processing unit 432 specifies the positions of the vertices R1 to R4 of the inspection target workpiece. The calculation processing unit 432 acquires, for example, the hues A1 to A4, the saturations B1 to B4, and the values C1 to C4 of the vertices R1 to R4 from the HSV values (H: Hue, S: Saturation, V: Value (brightness)) of the inspection target workpiece image, and calculates the illuminances of the vertices R1 to R4 based on the acquired values. Note that not only HSV values but also RGB values and values in other color spaces may be used. Alternatively, the spectrum diffraction quantity (spectrum diffraction illuminance) of each vertex may be obtained by other methods.

Next, the inclination angle of the target workpiece is estimated from the difference between the contour of the reference workpiece and that of the target workpiece and the spectrum diffraction quantity of each vertex. In this example, the three-dimensional inclination angle of the workpiece is estimated from the illuminances (the spectrum diffraction quantities) of the points of the workpiece and a transition (a difference between the contours) of the coordinate of a point due to the inclination of the workpiece based on the two-dimensional image in the following S402 to S404. Specifically, the calculation processing unit 432 calculates the Z-axis coordinate of the point (any of the points) of the inspection target workpiece (S402). The calculation processing unit 432 compares the reference workpiece image with the inspection target workpiece image, and calculates the Z-axis coordinate (e.g., coordinate in a direction of a first axis) at the point based on the illuminances at the points of the reference workpiece image and the inspection target workpiece image from the relationship between the distances from the light source and the illuminance. For example, the Z-axis coordinate of a vertex of the workpiece whose illuminance is obtained as described above is calculated. Here, it is assumed that the direction perpendicular to the planes of the X-axis direction (e.g., in a direction of a second axis) and the Y-axis direction (e.g., in a direction of a third axis) of the reference workpiece is the Z-axis direction, and that light is emitted to the workpiece from the light source at a position in the Z-axis direction.

Figure 11:
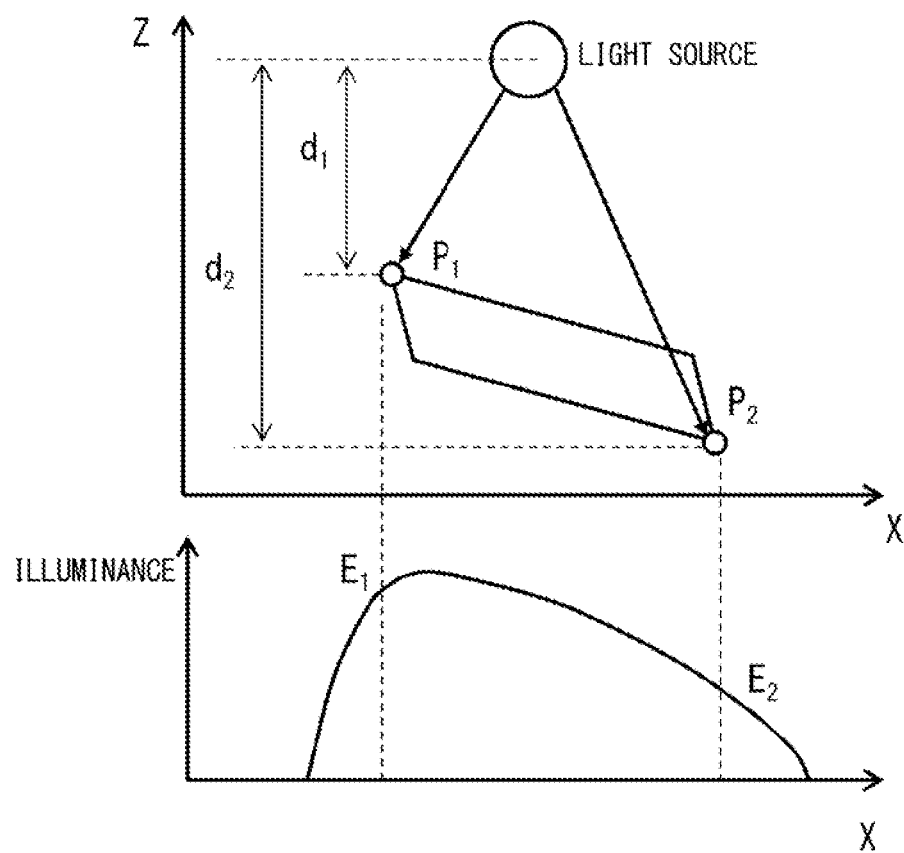
FIG. 11 shows a relationship between an illuminance and an distance.

As shown in FIG. 11, the illuminance at a point depends on a distance from the light source. When the illuminance at a point $P_1$ located at a distance $d_1$ from the light source is defined as $E_1$ and the illuminance at a point $P_2$ located at a distance $d_2$ from the light source is defined as $E_2$, the following Formula (3) is satisfied. For example, the Z-axis coordinate of the point (any of the points) is obtained from the relational expression of the distance from the light source and the illuminance. The Formula (3) is an example of the relational expression, and other formulas may be used.

[Formula 3]

$$E_2 = \frac{1}{\left(\frac{d_2}{d_1}\right)^2} \cdot E_1 \qquad (3)$$

The distance (the Z-axis coordinate) of each vertex of the reference workpiece in the reference workpiece image is a predetermined distance. Thus, the Z-axis coordinate of one of the vertices of the inspection target workpiece can be obtained from the illuminance of the vertex of the reference workpiece in the reference workpiece image and the illuminance of a vertex of the inspection target workpiece in the inspection target workpiece image using the Formula (3).

Next, the calculation processing unit 432 estimates a rotation angle of the inspection target workpiece around the Z-axis (S403). The calculation processing unit 432 calculates a rotation angle $\theta z$ around the Z-axis from the Z-axis coordinate of the point calculated as described above. For example, a position of a center point O is specified, and an angle around the Z-axis between a line extending from the center point O to one of the vertices of the reference workpiece in the reference workpiece image and a line extending from the center point O to the corresponding vertex of the inspection target workpiece in the inspection target workpiece image is calculated.

Figure 12:
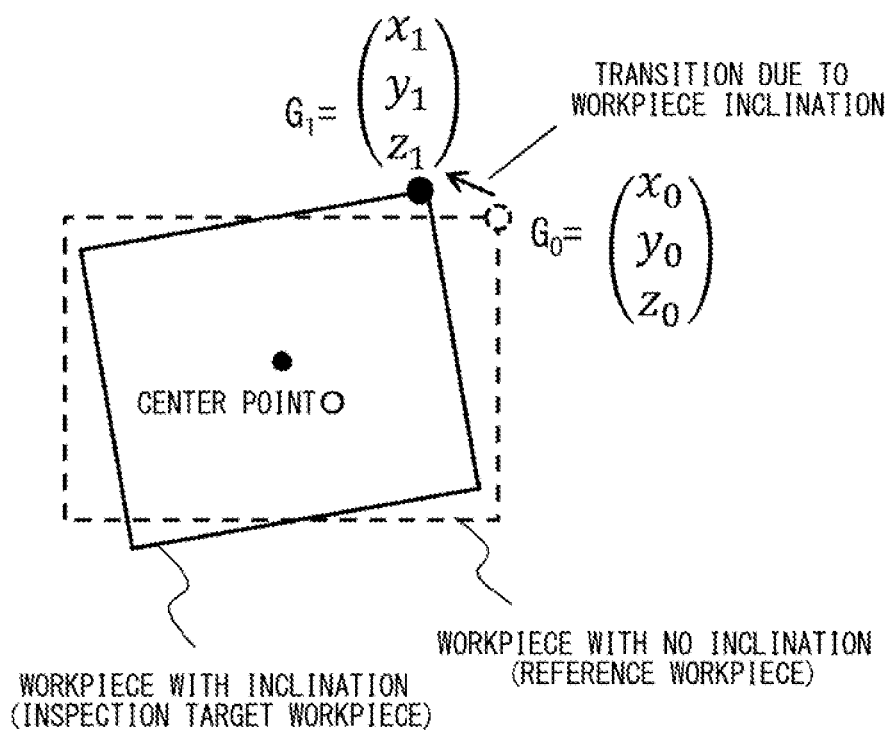
FIG. 12 shows examples of coordinates of a workpiece with inclination and a workpiece with no inclination.

Next, the calculation processing unit 432 estimates the rotation angle around the X-axis and the rotation angle around the Y-axis of the inspection target workpiece (S404). For example, as shown in FIG. 12, the three-dimensional coordinate of a point $G_0$ (any of the points) of the workpiece (the reference workpiece) with no inclination and the three-dimensional coordinate of a point $G_1$ (any of the points) of the workpiece (the inspection target workpiece) with inclination are acquired. The X-axis coordinate and the Y-axis coordinate can be acquired from the image plane, and the Z-axis coordinate can be calculated by the above method. The rotation angle around the X-axis and the rotation angle around the Y-axis are obtained from a transition of the point $G_0$ to the point $G_1$ due to the inclination of the workpiece and the rotation angle $\theta z$ calculated as described above. The calculation processing unit 432 calculates the rotation angle $\theta x$ around the X-axis and the rotation angle $\theta y$ around the Y-axis from the three-dimensional coordinates of a point of the workpiece with inclination and a corresponding point of the workpiece with no inclination and the rotation angle $\theta z$ around the Z-axis using, for example, the following Formula (4). The Formula (4) is an example, and other formulas may be used. In this way, the three-dimensional inclination angles ($\theta x$, $\theta y$, $\theta z$) of the inspection target workpiece are estimated.

[Formula 4]

$$\begin{pmatrix} x_1 \\ y_1 \\ z_1 \end{pmatrix} = \begin{pmatrix} \cos\theta_z & \sin\theta_z & 0 \\ -\sin\theta_z & \cos\theta_z & 0 \\ 0 & 0 & 1 \end{pmatrix} \quad (4)$$

$$\begin{pmatrix} \cos\theta_y & 0 & -\sin\theta_y \\ 0 & 1 & 0 \\ \sin\theta_y & 0 & \cos\theta_y \end{pmatrix} \begin{pmatrix} 1 & 0 & 0 \\ 0 & \cos\theta_x & \sin\theta_x \\ 0 & -\sin\theta_x & \cos\theta_x \end{pmatrix} \begin{pmatrix} x_0 \\ y_0 \\ z_0 \end{pmatrix}$$

Figure 13:
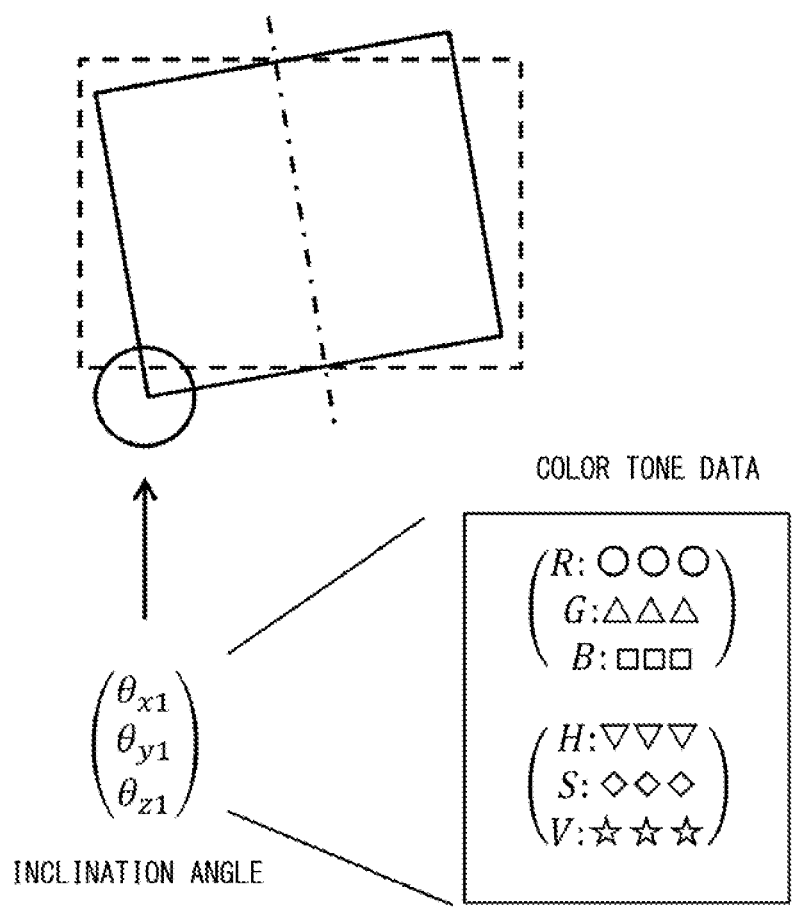
FIG. 13 shows an example of color tone data corresponding to an inclination angle.

Next, the calculation processing unit 432 calculates the color tone correction formula from the correction value and the workpiece inclination angle (S405). As shown in FIG. 13, the color tone data corresponding to the inclination angle at a point of the workpiece is previously learned, and the inclination angle and the color tone data are stored in the color tone data storage unit 423 in association with each other at each point. The stored color tone data is a difference from the reference value and is a color tone correction value for correction according to the inclination angle. For example, the color tone data is an RGB value and an HSV value corresponding to the inclination angles (Ox, Oy, Oz). Both the RGB value and the HSV value may be used as the color tone data, or only one of them may be used as the color tone data. Alternatively, the values of other color spaces may be used as color tone data. For example, the color tone is a color specified in a predetermined color space, and the color tone correction means correcting a position in the predetermined color space. That is, the color tone in this embodiment includes an element(s) (any of elements) in RGB, HSV, or any other color spaces.

The calculation processing unit 432 calculates the color tone correction formula from the relationship between the inclination angle and the color tone difference (the color tone data). Specifically, a color tone correction formula U is obtained from a correction value W and an inclination angle θ using the following Formula (5). The correction value W is based on the relationship between the inclination angle and the difference between the color tones, and is, for example, a correction value of an RGB value. For example, the color tone correction formula may be obtained for each point.

[Formula 5]

$$U = W \cdot \theta \quad (5)$$

$$W = \begin{pmatrix} W_R & W_G & W_B \end{pmatrix} = \begin{pmatrix} \alpha_R & \beta_R & \gamma_R \\ \alpha_G & \beta_G & \gamma_G \\ \alpha_B & \beta_B & \gamma_B \end{pmatrix}, \theta = \begin{pmatrix} \theta_x \\ \theta_y \\ \theta_z \end{pmatrix}$$

Next, as shown in FIG. 5, the image correction unit 433 corrects the image based on the workpiece inclination angle and the color tone correction formula (S310). The image correction unit 433 corrects the color tone of the inspection target workpiece image using the workpiece inclination angle estimated by the calculation processing unit 432 and the color tone correction formula of the Formula (5). For example, the color tone correction formula for each point is used to correct the color tone of the whole workpiece.

Next, the corrected image transfer unit 441 transmits the color tone corrected image to the inspector PC 500 (S311). The corrected image transfer unit 441 transmits the inspection target workpiece image corrected by the image correction unit 433 to the reception unit 510 of the inspector PC 500. The corrected inspection target workpiece image is displayed on the display unit 442 of the determination PC 400.

Figure 14:
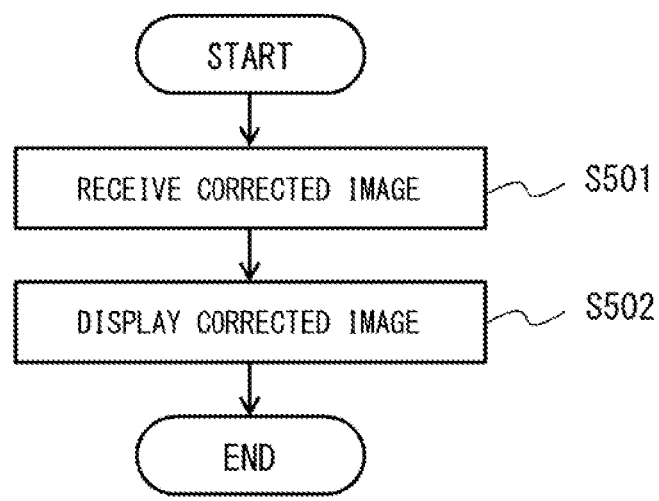
FIG. 14 is a flowchart showing a processing flow of image display processing according to the embodiment of the present disclosure.

Next, the image display processing in S103 shown in FIG. 3 will be described. FIG. 14 is a flowchart showing a processing flow of the image display processing. This image display processing is executed by the inspector PC 500.

As shown in FIG. 14, the reception unit 510 receives the corrected image from the determination PC 400 (S501). When the determination PC 400 corrects the color tone of the inspection target workpiece image and then transmits corrected inspection target workpiece image, the reception unit 510 receives the corrected inspection target workpiece image. Next, the display unit 520 displays the received corrected image (S502). When the reception unit 510 receives the corrected inspection target workpiece image, the display unit 520 displays the received corrected inspection target workpiece image. The inspector determines the component assembling position of the workpiece from the displayed image.

As described above, in this embodiment, in the inspection system for determining the component assembling position in the workpiece from the image, a reference image database (including inclined images) is prepared, and based on the reference image and the image obtained by photographing the inspection target workpiece, the inclination angle of the workpiece is estimated based on the difference between the contour of the reference workpiece and that of the inspection target workpiece due to the inclination of the workpiece and the illuminance of each vertex. Then, the color tone of the component due to the inclination of the workpiece in the inspection target workpiece image is corrected. Thus, when the component assembling position in the workpiece is determined from the image, even if the color tone of the component changes due to the inclination of the workpiece, the color tone of the image is corrected according to the inclination of the workpiece, so that the image becomes clear. Therefore, the component assembling position in the workpiece can be appropriately determined, and it is possible to detect a wrong/missing component at the manufacturing site.

Note that the present disclosure is not limited to the embodiment described above, and may be appropriately modified without departing from the scope thereof. For example, in the above embodiment, the color tone correction system for detecting the presence or absence of the inclination of the workpiece and estimating the inclination angle and correcting the workpiece image has been described. However, it may be an apparatus that detects the presence or absence of the inclination of the workpiece and outputs it, or it may be an apparatus that estimates and outputs the inclination angle of the workpiece.

Each of the configurations in the above-described embodiment may include hardware and/or software, may include one piece of hardware or software, or may include a plurality of pieces of hardware or software. The function (processing) of each apparatus may be implemented by a computer including a CPU (Central Processing Unit), a memory, etc. For example, a program for performing the method according to the embodiment (e.g., color tone correction methods) may be stored in the storage apparatus, and each function may be implemented by the CPU executing the program stored in the storage apparatus.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (Read Only Memory), CD-R/W (compact disc rewritable), and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A color tone correction system for image determination when a component assembling position of a workpiece is determined from an image, the color tone correction system comprising:
    a reception unit configured to receive a target workpiece image obtained by photographing a target workpiece and design information of the target workpiece;
    a reference workpiece image storage unit configured to store a reference workpiece image obtained by photographing a reference workpiece;
    an image determination unit configured to determine whether or not the target workpiece is inclined more than the reference workpiece based on the received target workpiece image and the received design information;
    a calculation processing unit configured to estimate an inclination angle of the target workpiece based on the stored reference workpiece image and the target workpiece image when it is determined that the target workpiece is inclined;
    a color tone data storage unit configured to store a relationship between the inclination angle and a color tone correction value;
    an image correction unit configured to correct a color tone of the target workpiece image based on the estimated inclination angle and a color tone correction formula corresponding to the stored relationship; and
    an output unit configured to transmit and/or display the corrected target workpiece image,
    wherein the calculation processing unit is configured to compare the reference workpiece image with the target workpiece image, and estimate the inclination angle of the target workpiece based on a difference between a contour of the reference workpiece and a contour of the target workpiece and a spectrum diffraction quantity of each vertex,
    the calculation processing unit is configured to calculate a coordinate of a point of the target workpiece in a direction of a first axis based on an illuminance of a point of the reference workpiece and an illuminance of a point of the target workpiece, and estimate the inclination angle of the target workpiece around the first axis from the calculated coordinate, and
    the calculation processing unit is configured to estimate the inclination angles around a second axis and a third axis of the target workpiece based on the inclination angle around the first axis, a three-dimensional coordinate of a point of the reference workpiece, and the three-dimensional coordinate of the point of the target workpiece.

2. A color tone correction method for image determination when a component assembling position of a workpiece is determined from an image, the color tone correction method comprising:
    receiving a target workpiece image obtained by photographing a target workpiece and design information of the target workpiece;
    storing a reference workpiece image obtained by photographing a reference workpiece;
    determining whether or not the target workpiece is inclined more than the reference workpiece based on the received target workpiece image and the received design information;
    estimating an inclination angle of the target workpiece based on the stored reference workpiece image and the target workpiece image when it is determined that the target workpiece is inclined;
    storing a relationship between the inclination angle and a color tone correction value;
    correcting a color tone of the target workpiece image based on the estimated inclination angle and a color tone correction formula corresponding to the stored relationship; and
    transmitting and/or displaying the corrected target workpiece,
    wherein the estimating of the inclination angle of the target workpiece includes comparing the reference workpiece image with the target workpiece image, and estimating the inclination angle of the target workpiece based on a difference between a contour of the reference workpiece and a contour of the target workpiece and a spectrum diffraction quantity of each vertex,
    the estimating of the inclination angle of the target workpiece includes calculating a coordinate of a point of the target workpiece in a direction of a first axis based on an illuminance of a point of the reference workpiece and an illuminance of a point of the target workpiece, and estimating the inclination angle of the target workpiece around the first axis from the calculated coordinate, and
    the estimating of the inclination angle of the target workpiece includes estimating the inclination angles around a second axis and a third axis of the target workpiece based on the inclination angle around the first axis, a three-dimensional coordinate of a point of the reference workpiece, and the three-dimensional coordinate of the point of the target workpiece.

* * * * *